Figure 2:
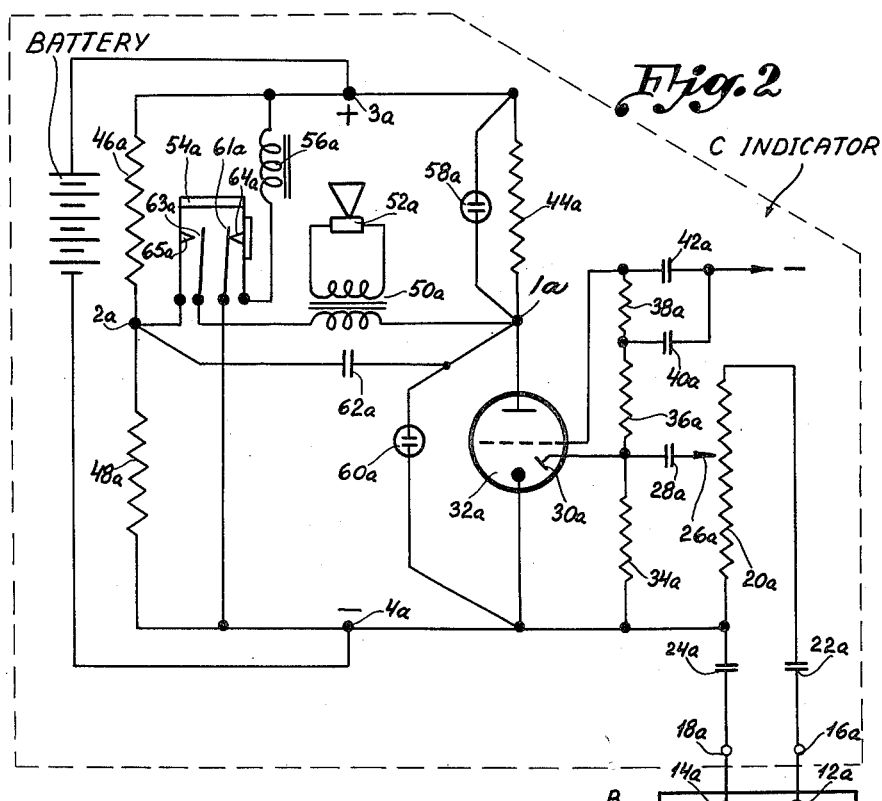

Feb. 5, 1957         F. M. NIELSEN         2,780,775
LOCATION OF PERIODIC DEFECTS IN ELECTRONIC CIRCUITS
Filed Aug. 11, 1953         2 Sheets-Sheet 1

INVENTOR.
Frank Martin Nielsen
BY

Feb. 5, 1957 F. M. NIELSEN 2,780,775
LOCATION OF PERIODIC DEFECTS IN ELECTRONIC CIRCUITS
Filed Aug. 11, 1953 2 Sheets-Sheet 2
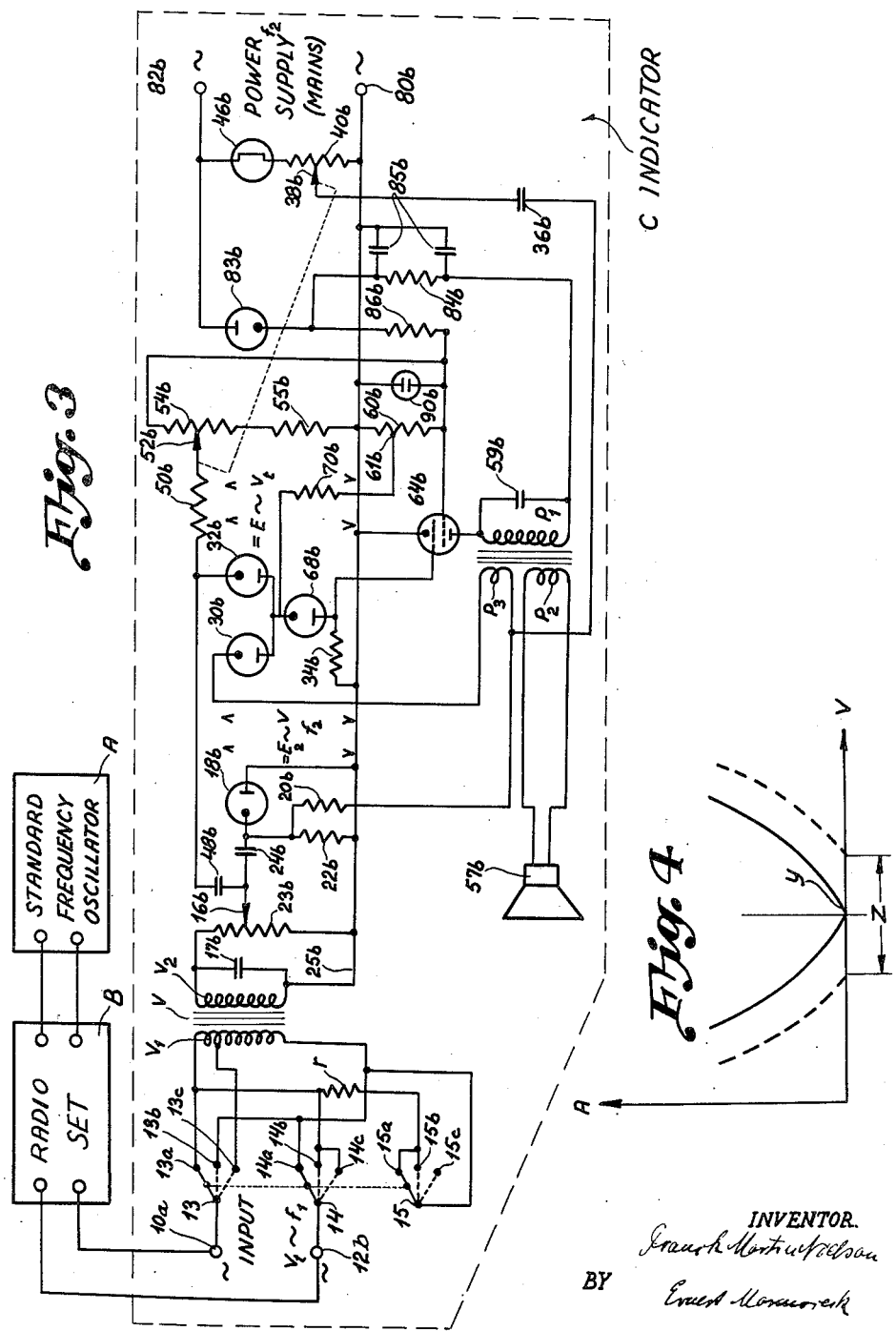
INVENTOR.
Frank Martin Nielsen
BY
Ernest Moranowski United States Patent Office 2,780,775
Patented Feb. 5, 1957

2,780,775

LOCATION OF PERIODIC DEFECTS IN ELECTRONIC CIRCUITS

Franck Martin Nielsen, Aalborg, Denmark

Application August 11, 1953, Serial No. 373,489

Claims priority, application Denmark May 16, 1947

24 Claims. (Cl. 324—57)

The invention relates to testing of electronic circuits.

This application is a continuation-in-part of my applications Serial No. 26,314 filed on May 11, 1948, and forfeited on January 17, 1954, and Serial No. 114,367 filed September 7, 1949 and forfeited on August 19, 1953.

One of the main objects of the invention is to provide methods and means for localizing defects in electronic circuits, such as radio receivers, electric amplifiers and similar equipment.

Another more specific object of the invention is to provide methods and means for localizing periodically recurring defects in such equipment.

A further object of the invention is to provide methods and means for the purpose specified, which are simple and effective and admit of less personal attention than in any apparatus or method of this type previously proposed.

Further objects of the invention will appear from the following specification, in which the invention is elucidated by way of examples.

Figure 1:
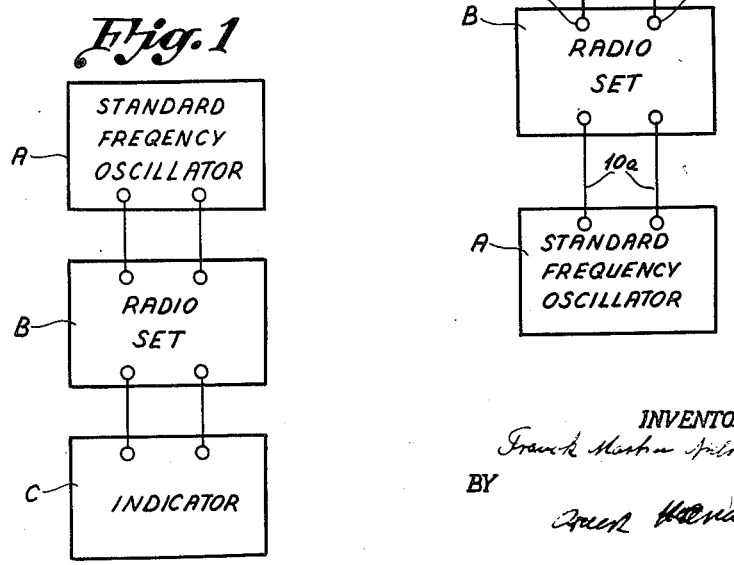

In the drawing:

Fig. 1 is a block diagram showing very roughly the way of interconnecting different units for the purpose of carrying out the test according to the present invention, Fig. 2 is a more detailed, but still schematic, diagram showing the testing and indicator circuits in one embodiment of the invention, Fig. 3 is a more detailed, but still schematic diagram showing the testing and indicator circuits in another embodiment of the testing arrangement according to the invention, and Fig. 4 is a curve illustrating a part of the operation of the circuit to be described with reference to Fig. 3.

In general terms my invention is based on the recognition of the following problems and a novel teaching derived therefrom.

It has always been a problem to localize the source of periodically occurring defects in electronic circuits such as radio sets; such defects may be in form of a leak in a resistor, a condenser, an unsatisfactory soldering or anything else which only shows up now and then for instance when the radio is subjected to small vibrations or when the electric potential somewhere in the circuits is rising to an extraordinary high value.

Finding of normal defects is a relatively easy job, because such defects can be located by the way of measuring.

Localizing of periodically occurring defects is, however, a complicated operation. It is apparent that they can only be looked for when they are showing up and for some reason the periodically occurring defects have an ability to disappear when the circuits are touched.

The traditional way of finding such defects has hereinbefore been to start the set and allow the receiver to play. No serviceman, however, can waste his time just sitting down in front of the playing set waiting for the defect to turn up. He will have to do something else in meantime. Considering, however, that he has to pay the radio set with a periodic defect immediate attention as soon as the defect occurs, the serviceman is not able to concentrate one hundred percent on other matters.

In operation I am starting the electronic apparatus under test and in my measuring circuit I compensate the output voltage of the apparatus under tests so as to be silent during normal operation. When, however, the defect occurs it changes the output of the set under test, so that the equilibrium of the compensation is brought out of balance and an acoustic indicator sounds immediately to tell the serviceman that the defect is there.

In contrast to normal practice the serviceman after having been warned that the defect was there, does not need to look after the defect immediately. He simply moves the input terminals to the test device from the output of the apparatus under test to be applied to the last stage but one in the apparatus under test thereby cutting out for instance the output step in a radio apparatus. Then the serviceman again adjusts the test circuits to be silent during normal operation. The next time the defect turns up in form of a sound in the acoustic indicator he cuts away a further stage of the apparatus under test and continues doing that each time he is notified that the defect has occurred. Sooner or later there will be a stage of the measuring process at which the defect will no longer show up. The serviceman will then know that the defect can only be in that stage of the electronic apparatus which was last cut away during the process of measuring. He can then concentrate his efforts on measurements of the resistor or other components in that last stage. This is not too complicated a measuring process and he will easily be able to find the defective part and change it with the new one.

By carrying out the test in the way here briefly outlined a testing method is obtained, which will advise the serviceman when the defect is occurring and simultaneously relieve the serviceman from the strain of paying constant attention to a playing set when doing other things.

Also the testing method has the advantage that it will indicate the occurrence of the periodic defect in a manner which cannot be overlooked by the serviceman even when he is busy with other matters.

Furthermore the testing method is simple and reliable and can be used in connection with any electronic circuit apparatus for indicating a periodically occurring defect only when it shows up and then in such a manner that the attention of the serviceman will immediately be drawn to the apparatus under test.

Referring now more specifically to Fig. 1 this shows three units comprising a unit A, which is a standard frequency oscillator of the type used in any serviceman's laboratory and being capable of delivering a high frequency output voltage to be applied to the electronic circuits to be tested; B is a unit which is the electronic apparatus to be tested such as a radio set in the operation of which the owner has found a defect, which is not permanently showing up but appears at irregular intervals and may for example be corrected sometimes simply by knocking on the casing of the radio set. Finally C is the indicator circuit which according to the present invention may be embodied in various manners. This indicator circuit comprises an acoustic indicator such as a loud speaker and means for maintaining the acoustic indicator silent, as long as the electronic circuit device B functions satisfactorily but gives an acoustic signal when the defect turns up.

Different embodiments of the indicator circuit will be described with reference to Figs. 2, 3 and 4 in the following.

In broad terms my invention resides in a testing method as follows:

I am setting my standard frequency oscillator A to a certain output and a certain frequency. I apply initially this output to the input terminals of the electronic circuit set B under test. If this electronic circuit set is a normal radio set I connect the output terminals from the standard frequency oscillator to the aerial and ground terminals of the radio set.

This will produce an output voltage from the loud speaker terminals of the radio set. This output voltage is applied to the indicator C. The indicator is provided with certain control knobs by means of which I can adjust the indicator so that the acoustic indicator or loud speaker thereof is silent for that output voltage which is produced by the radio set B for the specific input applied to the input terminals from the standard frequency oscillator, provided the defect is not showing up.

I am then leaving the three units as adjusted. As long as the radio set is working without the defect, there is no sound in the loud speaker of the indicator, and the serviceman can spend his time on whatever he has to do in the meantime.

If there is a defective condenser or resistance somewhere in the radio set there will sooner or later be a showing of a leak in the condenser or a short-circuiting of the resistance or any other sort of periodically occurring defect in the radio set will show up. Such showing of a defect will result in a change of the output from the radio set. Because the indicator is adjusted to be silent for a predetermined output from the radio set, a change in the output will result in a sound in the acoustic indicator of the indicator circuit, and the serviceman will be warned that now the defect has turned up. In some cases the defect will last some time and the serviceman can try and see whether he can find it. Mostly such periodically occurring defects have a curious ability to disappear when one approaches the set.

Assuming that the radio set is a standard set comprising an aerial circuit, a mixer tube stage, an intermediate frequency stage and a low frequency stage, the serviceman will then shift the output terminals from the standard frequency oscillator from the aerial-earth terminals of the radio set to for instance the control grid and cathode of the mixer tube, readjust the indicator control handle to silence and then wait again.

If the defect has been somewhere in the input circuits between aerial and earth terminals and the point where the standard frequency oscillator has now been applied, no reaction from the loud speaker of the indicator circuit will ever be heard and the serviceman can concentrate his efforts on investigating the grid leak of the mixer tube or other components in the input circuit of the set.

If, however, a noise is again produced from the indicator loud speaker the serviceman will be attracted by this noise and try to see what he can find again. In most cases he can find nothing and he will then again move the output terminals from the standard frequency oscillator to the next stage of the radio set for instance to the grid of the mixer tube oscillator portion and the cathode of the oscillator tube, readjust the indicator to the point of silence and wait again.

This procedure will be repeated when applying the output from the standard frequency oscillator to the control grid and cathode respectively of the I. F. stage and finally to the control grid and cathode of the audio stage. Assuming for instance that the defect is in the I. F. transformer in the anode circuit of the I. F. stage the indicator circuit will stop to produce noise when the output from the standard frequency oscillator has been moved to that part of the radio set which follows the I. F. stage.

The serviceman will then know that the defect is in that part of the circuit which has been switched off last and he can concentrate his efforts on investigating parts of that circuit, which comprises for instance the anode resistance of the I. F. stage, the anode transformer thereof and a few voltage divider resistances such as used for the screen grid of the I. F. tube. The investigation of these parts is not too complicated and it may soon be found that for instance a soldering of the I. F. transformer is not satisfactory and now and then for instance due to the heating from the heat producing parts inside the set changes the characteristics of the I. F. circuit and gives rise to scratch, distortion or whatever might have turned up to the dissatisfaction of the user of the radio set.

In accordance with my invention there may be various practical forms of the indicator circuit. One form is shown in Fig. 2, where A and B represent the standard frequency oscillator and the radio set under test respectively. The output terminals from the radio set 12a and 14a are connected to the input terminals 16a and 18a of the indicator circuit.

A potentiometer 20a is connected in series with two condensers 22a and 24a over the input terminals of the indicator circuit. From the movable contact 26a of the potentiometer there is a connection through a condenser 28a to a diode anode 30a in an electron tube 32, the cathode of which is connected to the lower end of the potentiometer 20a. The diode is shunted by a resistance 34a. The alternating voltages from the radio set is hereby rectified in the diode, and a voltage drop appears over the resistance 34a. The magnitude of this voltage drop depends upon the position of the movable contact 26a on the potentiometer.

This direct current voltage is filtered through a filter consisting of resistances 36a and 38a and condensers 40a, 42a and then the direct current voltage is supplied as a grid bias to the grid of the electron tube 32a, whereby the resistance of this tube is adjusted according to the grid bias.

The tube 32a forms one branch of a Wheatstone-bridge the other branches of which consist of resistances 44a, 46a, 48a, and the corner points of which are designated 1a, 2a, 3a and 4a. A direct current source for instance a battery, as shown, is inserted between the corner points 3a, 4a, and when the oscillator A is connected, the adjustable contact 26a of the potentiometer 20a is adjusted to bias the tube 32 so that no potential difference, namely a zero potential, appears between the corner points 1a, 2a of the Wheatstone bridge by normal output voltage from the terminals 12a and 14a of the radio set. The indicator, which is inserted between the two corner points 1a and 2a, is thus inactive as long as the apparatus functions normally. When the periodic defect, however, appears, it results in either an increase or a drop in the output voltage which disturbs the balance of the bridge by changing the grid bias of the tube 32a and thereby the anode resistance thereof; this potential differential causes current to pass through the indicator connected across the points 1a and 2a.

By moving the oscillator from one circuit of the receiver to the next one each time after the defect has appeared, it is possible to locate the defect.

The indicator is an acoustic indicator such as a loud speaker 52a inserted by means of a usual loud speaker transformer 50a. In series with the primary winding of the loud speaker transformer there is inserted a switch operable to oscillate by means of a coil 56a in the same way as a vibrator so as to produce a current having a frequency sufficiently high to make it audible in the loud speaker. The switch 54a comprises a movable part having contacts 64a and 65a and two stationary contact terminals 62a and 63a. The contact terminal 62a completes with the contact 64a the circuit of a driving coil 56a, and the terminal 63a completes the circuit of the transformer 50a during the periodical interval following movement of the part 61a owing to the energization of the driving coil 56a.

Furthermore signalling lamps 58a and 60a may be inserted parallel with the bridge branches. Hereby it is possible simultaneously to get an indication of whether the defect causes a voltage increase or a voltage drop in the output voltage. The bridge is so adjusted that the voltage drop over the two bridge branches 44a and 32a is equal. Under normal balancing of the bridge the two signalling lamps 58a and 60a will be turned on and by observing which of the lamps is extinguished during the indication it is possible to perceive whether the defect causes an increase or a drop in the output voltage.

In practice a condenser 62a may conveniently be inserted over the bridge diagonal 1a, 2a in order to stabilize the alarm tone just as well as condensers may be inserted over the other bridge branches in order to stabilize the function of the indicator.

The switch need not be driven by a coil, but may be driven by any other means, for example by a rotating motor.

From the foregoing specification it will be apparent that I have developed an improved process for localizing periodically occurring defects in electronic circuits.

In operation I start the electronic apparatus to be under test and I compensate in my measuring circuit the output voltage of the apparatus under test so as to be silent during normal operation. When, however, the defect occurs and changes the output of the set under test the equilibrium of the compensation is brought out of balance and the acoustic indicator sounds immediately to tell the serviceman that the defect is there.

It will be appreciated that the indicator circuit arrangement of Fig. 2 on account of the use of an electronic tube as a part of the balanced indicator circuit reacts immediately without any delay and will thus instantaneously call the attention of the serviceman to the defect of the electronic circuit set under test.

The frequency of the indicator loud speaker, i. e. the acoustic signal, which will be transmitted to the serviceman to indicate the occurrence of the defect, will in this embodiment only be the frequency of the voltage applied across the terminals 1a and 2a. Now it may happen that some defects give rise to a decrease of the output voltage of the set B and other defects give rise to a increase of the output voltage. These defects will in the embodiment of Fig. 2 be recognized by the serviceman by watching the indicator lamps 58a and 60a only, and if the defect has disappeared, before the serviceman is in a position to watch these lamps, it will be of little use to him to know that one or the other of them has been showing the effect of the fault on the output voltage across the terminals 12a and 14a.

In order to enable the serviceman to distinguish from the frequency reproduced by the acoustic indicator of the indicator circuit whether the defect results in an increase or a decrease of the output voltage of the set under test, a circuit as shown in Fig. 3 may be used. In this circuit there is used as in the example described hereinbefore a standard frequency oscillator A, the output from which is applied subsequently to parts of the electronic set B under test. The output voltage from this set B is applied to input terminals 10b and 12b of the indicator circuit. These terminals are connected to contacts 13b and 14b of a switch arrangement comprisng a triple pole switch having three different positions. In this switch a further contact corresponding to the contacts 13b and 14b is marked 15b. The corresponding contacts of the switches are marked 13a, 13b, 13c, 14a, 14b, etc. The contacts 13a and 14a are connected to each end of a primary winding V₁ of a transformer having a secondary winding V₂. The contacts 13b and 14b are connected to the opposite ends of the transformer winding V₁. Furthermore the contacts 14b and 14c are interconnected. Contact 13c is connected to a tapping of the transformer winding V₁. The two contacts 15a and 15b are interconnected and through a resistance r connected with the same end of the transformer windings as contacts 13a and 14b. The contact 15c is blind.

The secondary winding V₂ of the transformer is shunted by a condenser 17b and a voltage divider 23b. The voltage divider has an adjustable tapping 16b. From the lower end of the transformer winding V₂ and the voltage divider 23b there is a neutral connection 25b connected to one pole 80b of a power supply delivering the necessary operating voltage.

The variable tapping 16b of the voltage divider 23b is through a condenser 24b connected to the cathode of an unlinear rectifier for instance as shown a diode 18b. The cathode of the diode 18b is further through a resistance 22b connected to the neutral lead 25b and through a further resistance 20b and a secondary winding P₃ of a transformer having a primary winding P₁ and a further secondary winding P₂ connected to the cathode of another unlinear rectifier, a diode 30b.

Furthermore the variable tapping 16b is through a condenser 48b connected with the cathode of another unlinear rectifier, such as a diode 32b, which in its turn through a resistance 50b is connected with the variable tapping 52b of another voltage divider 54b.

The anode of the diode 18b is connected directly to the neutral lead 25b. The anodes of the two other diodes 30b and 32b are interconnected and connected to the cathode in a further rectifier 68b. The anode of this rectifier 68b is through a resistance 34b connected with the neutral lead 25b. Furthermore the anode of the rectifier 68b is directly connected with the control grid of an electron tube 64b.

Another pole 82b of the power supply is connected with the anode of a rectifier 83b. The cathode of this is through a filter resistance 84b from each end of which two filter condensers 85b are connected with the neutral lead 25b connected with one end of the transformer winding P₁, the other end of which is connected with the anode of the electron tube 64b.

Hereby the direct voltage produced is applied as anode voltage on tube 64b. Furthermore the cathode of the rectifier 83b is through a resistance 86b connected with a screen grid in tube 64b, from which a further resistance 60b is connected to neutral lead 25b. From a fixed tapping 61b on the resistance 60b a fraction of the voltage is through a further resistance 70b used as a bias for the rectifier 68b.

Furthermore the cathode of the rectifier is connected with the top end of the voltage divider 54b, the other end of which through a resistance 55b is connected to the neutral lead 25b.

The power supply terminals 80b and 82b are further shunted by a voltage divider 40b preferably in series with a current regulator tube 46b. The voltage divider has an adjustable tapping 38b, which through a condenser 36b and the transformer winding P₃ is connected with the cathode of the diode 30b.

The transformer winding P₂ is connected to an indicator loud speaker 57b. The transformer winding P₁ is shunted by a condenser 59b. Between the screen grid of tube 64b and the neutral lead 25b a voltage stabilizer 90b is arranged.

The device described operates in the following manner:

When the input terminals are connected with an alternating voltage source such as the amplified output from the radio set B, this voltage is with the switch in the position shown in full lines applied over the transformer winding V₁. In this position of the switch the resistance r is shunted across the transformer winding.

Hereby a certain alternating voltage is produced over the secondary winding V₂ and the voltage divider 23b.

This alternating current is an unknown current. It is rectified by means of the rectifier 18b. The direct current hereby produced is through the resistance 20b applied to the diode 30b. This rectified voltage is indicated as E₁. Furthermore the alternating current is through a condenser 48b applied to the diode 32b. This alternating voltage is in the drawing indicated as $V_t$. The frequency of this alternating voltage is $f_1$.

The frequency of the power supply over the terminals $80b$ and $82b$ is $f_2$. The fraction of this voltage derived from the variable tapping $38b$ of the voltage divider $40b$ is through the condenser $36b$ and the transformer winding $P_3$ applied to the diode $30b$. This voltage is in the drawing indicated with V.

From the tapping $52b$ of the voltage divider $54b$ a rectified fraction of the power supply is further through the resistance $50b$ applied to the diode $32b$. This is in the drawing indicated by E.

We now have over the diode $30b$ the direct voltage potential $E_t$ and the alternating voltage V with the frequency $f_2$. Over the diode 32 we have the direct voltage potential E and the alternating voltage potential V with frequency $f_1$.

From this it will be understood that if $E_t$ is equal to or larger than the maximum value of V, the diode 30 is blocked. Simultaneously the diode $32b$ is blocked if the maximum of $V_t$ is less or equal to E.

If $V_t$ is increasing the blocking of the iode $32b$ ceases and the current with the frequency $f_1$ is allowed to pass through the diode $32b$. Hereby a part of the negative amplitude of the voltage V is applied to the control grid of the tube $64b$.

During the time when the diode was blocked no alternating current voltage was allowed to pass, and therefore only the normal direct voltage was flowing in the tube $64b$. This direct voltage, however, does not give any indication in the loud speaker. When the blocking of the diode ceases, alternating voltage with the frequency $f_1$ will be applied to the control grid. Hereby the anode current decreases, and simultaneously it varies in response to the frequency of the alternating voltage applied.

The result therefore will be a signal in the loud speaker $57b$ with the frequency $f_1$.

During such an increase of $V_t$, $E_t$ will also increase, and therefore diode $30b$ will remain blocked, so that no current with the frequency $f_2$ will be allowed to pass.

If, however, $V_t$ decreases, $E_t$ will also decrease. When $E_t$ hereby decreases to a value, which is less than the maximum value of V, the blocking of diode $30b$ will cease. Hereby current with the frequency $f_t$ is allowed to pass the diode $30b$, and accordingly a modulation of tube $64b$ will now take place, so that an indication with the frequency $f_2$ will be heard in the loud speaker. With $V_t$ and $E_t$ decreasing, the diode $32b$ is still blocked, so that no current with the frequency $f_1$ will pass through diode $32b$.

From this explanation it will be understood that the basic principle of the apparatus is to supply two alternating currents and two direct currents. Either of these is variable as a function of the operating condition to be controlled. These four voltages are balanced so that a compensation is obtained as long as the variable voltages are constant. This compensation is obtained by giving the cathode of the diode $30b$ such an alternating current bias V and the cathode of the diode $32b$ such a constant direct current bias E that they will both be blocked as long as E is larger or equal to the maximum valve of V, and simultaneously the maximum value of V is less or equal to $E_t$.

When, however, $V_t$ increases the frequency $f_1$ will be allowed to pass, and when $V_t$ and thereby also $E_t$ decreases, the frequency $f_2$ will be allowed to pass.

From this it will be understood that a certain variation of $V_t$ and thereby $E_t$ can be allowed.

Suppose we have a certain adjustment of the variable tapping $16b$ corresponding to a certain fraction of the voltage supply. This will leave a certain value of $V_t$ and $E_t$. If for such a value the tapping $38b$ is adjusted to give a maximum amplitude of V differing from $E_t$ and less than $E_t$, the diode $30b$ will still remain blocked, until $E_t$ varies to a value, which is less than the maximum amplitude of V.

Simultaneously suppose the variable tapping $52b$ is adjusted to give a value of E differing from and larger than the maximum amplitude of V. The diode $32b$ will then still remain blocked, until the maximum amplitude of $V_t$ has reached and passed the value of E. This will give certain variation possibilities of the voltage applied without indication.

In other words this will allow a certain tolerance in variation of the alternating voltage applied to the circuit. In practice such tolerance can be obtained by interconnecting the two variable tappings $38b$ and $52b$ in such a manner that the tapping $38b$ delivers minimum of alternating voltage, when the tapping $52b$ delivers maximum of direct voltage.

In practice the diodes $30b$ and $32b$ will have a certain capacity so that in case of $f_1$ being a rather high frequency, a certain amount will be passed, even if diode $32b$ is blocked. This is prevented by means of diode $68b$, by giving this diode a positive bias from the tapping $61b$ on the resistance $60b$, it is blocked for small potentials of the cathode, and the disadvantage is avoided. The resistance $70b$ acts as stop resistance for high frequency voltages from the two diodes $30b$ and $32b$.

The secondary winding $P_3$ through which the alternating voltage from the tapping $38b$ is supplied has the purpose of making the lower main frequency more distinct. The same purpose has the condenser $59b$, which should be so chosen as to give the circuit formed by this condenser and the transformer winding $P_1$ a resonance frequency near the frequency $f_2$.

Similarly the condenser $17b$ which shunts the transformer winding $P_2$ should be dimensioned to form a circuit having its resonance frequency near the frequency $f_1$.

From the above described operation it will be understood that the circuit arrangement enables an indication of changes in the applied alternating voltage. This is proportional with the operating conditions to be controlled. By adjusting the tolerance control to allow larger or smaller departures from the voltage applied to the circuit, this can be adjusted to allow corresponding changes in the operating conditions.

It will be understood, however, that the apparatus may also be used for controlling alternating voltages independent of their origin.

With the switch arrangement shown left in the position in full lines, the input terminals are conected with the upper and lower end of the transformer winding $V_1$. With the switch in the intermediate position, the input terminals will be connected with the opposite ends, viz. the transformer will be reversed. This can be utilized to control amplitude distortion of an alternating voltage.

This is done in the following manner.

The alternating voltage to be controlled is applied with the switch in one of the two positions. The amplitude control is adjusted to zero and the tapping $16b$ is adjusted so that the alternating voltage supplied to the cathode of diode $32b$ has a maximum value, which just does not give any modulation tone. With this adjustment of the circuits the switch is thrown over to the other position. If there is no amplitude distortion, i. e. if the two half waves have the same amplitude, the loud speaker will remain silent. If the other part of the amplitude is smaller, it will mean a decrease of $E_t$ and accordingly indication with the frequency $f_2$. If it is larger it will mean an increase of $V_t$ and accordingly indication with the frequency $f_1$.

It has been found that the apparatus described enables a very effective control with respect to amplitude distortion, and that even so small differences in the two half waves, which cannot be seen on the screen of a cathode ray tube can be easily discovered by means of the arrangement described.

Up till now the third position of the switch has not been mentioned. As shown this disconnects the resistance r and connects only the part of the transformer winding between the top and the tapping across the input terminals. Hereby the step up ratio of the transformer is improved, which means a considerable increase in sensibility, also because the load R is disconnected.

By adjusting the tolerance control to zero and simultaneously using this third position of the switch, even the smallest changes of an applied alternating current can be discovered. The circuit arrangement can easily be built in practice to have a reaction less than .001 sec.

Figure 4 is a graphic illustration of the invention. The abscissa is the voltage applied to the input terminals $10b$ and $12b$, and the ordinate is the output supplied to the loud speaker $57b$. The point $y$ corresponds to the magnitude of the input voltage, when the two voltage divider tappings $38b$ and $52b$ are adjusted so that V maximum is equal to $E_t$ and $V_t$ maximum is equal to E.

As described before this will give a sharp minimum. Any departure of the magnitude of the input voltage from this will give indication, and the indication will be stronger the larger the departure is from the point $y$.

This is an interesting feature of this embodiment, because hereby as well the intensity of the signal as the frequency thereof will give an indication of, whether a small departure or a large departure from the normal value of the input voltage has occurred, viz. whether a large or a small departure from the normal operating condition has given rise to the indication.

By adjusting the tappings as described to allow a certain play between $E_t$ and V max. and E and $V_t$ max. respectively an interval $z$ on both sides of the point $y$ can be obtained. The curves shown in Fig. 4 are the normal characteristics of the electron tube $64b$.

It will be understood that in the foregoing specification the invention is described by means of examples only and that departures from these examples will be possible within the scope of the appended claims.

I claim:

1. The method of testing electronic circuits for localizing periodically occurring defects therein comprising; operating the circuits under substantially normal operating conditions to produce an output voltage of a predetermined value during defect-free periods, operating with said voltage an acoustic indicator to react non-inert for any departure of said predetermined value of the output voltage, allowing the electronic circuits to be operated during a period until said indicator at least once has signalled occurrence of the defect, then cutting off one stage of said electronic circuits, operating the remaining stages under substantially normal operating conditions to produce an output voltage, using said latter output voltage to operate the acoustic indicator to react non-inert for any departure of said latter output voltage from said remaining circuit stages for at least a similar period as that during which the first mentioned stages were operated, and, when during said time interval the defect again occurs, cutting off again a further stage of said electronic circuits and again proceeding in the same manner until the defect does not occur during an operating time interval, then examining the suspectable components in the stage last cut off.

2. A process of localizing such defects in electronic circuits which are occurring periodically only comprising; the steps of operating the circuits to be tested under substantial normal operating conditions to produce an output voltage to be hearable in a sound giving acoustic instrument, compensating said output voltage to render said acoustic instrument silent under said normal operating conditions so as to thereby sound said acoustic instrument only when said defect brings said compensation out of equilibrium by a change of said output voltage allowing the circuits to be operated until said acoustic instrument sounds, thereafter repeating said process with an output voltage taken from a different point of said electronic circuit to be tested, repeating said process again when sound is given by said acoustic instrument with an output voltage taken from another different point of said electronic circuits to be tested and so further on until said acoustic instrument remains silent.

3. A process of localizing such defects in electronic circuits, which are occurring periodically only comprising; the steps of operating the circuits to be tested under substantial normal operating conditions to produce an output voltage to be hearable in a sound giving acoustic instrument, compensating said output voltage to render said acoustic instrument silent under said normal operating conditions so as to thereby sound said acoustic instrument only when said defect brings said compensation out of equilibrium by change of said output voltage, allowing the circuits to be operated until the acoustic instrument sounds, thereafter repeating said process with an output voltage taken from a different point of said electronic circuits to be tested, repeating said process responsive to sound given by said acoustic instrument with an output voltage taken from another different point of said electronic circuits to be tested and so further on until said acoustic instrument remains silent, thereafter measuring individually the parts of said electronic circuits under test between said output voltage where taken lastly and next lastly.

4. A process for localizing such defects in multistage electronic circuits, which are occurring periodically only comprising the steps: operating a number of stages of said electronic circuits under substantial normal operating conditions to derive from said electronic steps under operation an output voltage to be transformed to produce sound in an acoustic sound-giving instrument, compensating said output voltage so as to render said sound giving instrument silent during said normal operating conditions so as to produce sound only when said output voltage changes in response to the occurrence of said periodic defect, operating another number of stages of said electronic circuits in the same manner after said defect having shown by sound in said sound giving instrument, waiting again for sound in said instrument, operating still another number of stages in said electronic circuits in the same manner, discontinuing the operation when said sound-giving instrument remains silent for a predetermined period and thereafter individually measuring that stage of said electronic circuit which is lying between the stage from which the output voltage was taken lastly and next lastly.

5. In an electric testing network having input terminals in combination: a bridge circuit comprising four branches and two diagonals, means for applying a voltage source across one diagonal to provide a potential differential between the ends of said diagonal, a sound giving instrument applied across the other diagonal, means for supplying an audible alternating current to said sound-giving instrument, an electronic valve having a cathode anode space inserted in one branch of said bridge, an input circuit for said electronic valve comprising a variable resistor to branch out a fraction of an alternating current voltage applied to said input terminals, means for rectifying said alternating current fraction and means for supplying said rectified alternating current fraction to control the resistance of said anode cathode space to thereby balance said bridge to deenergize said sound-giving instrument.

6. In combination with an electronic circuit apparatus in which is occurring a periodic defect, a standard signal generator to be connected to said electronic circuits to operate the same under substantial normal operating conditions to produce an output voltage of a predetermined value during defect-free periods, an indicator circuit having input terminals adapted to be connected to said electronic circuits to apply the produced output voltage across said input terminals, control means in said indicator circuit, means to operate said control means to produce a potential of the same magnitude at two spaced points in said indicator circuit for the said predetermined value of said output voltage, an acoustic indicator interconnected between said spaced points, and means to pass an alternating current through said indicator in response to the occurrence of a difference in potential between said points.

7. In combination with an apparatus having electronic circuits wherein a defect is occurring periodically only, a generator to operate said electronic circuits to produce an output voltage of a predetermined value during defective-free periods, an indicator circuit having input terminals adapted to be connected to said electronic circuits to apply the produced output voltage across said input terminals, said indicator circuit including a Wheatstonebridge, a vacuum tube associated with said Wheatstonebridge, means to operate said vacuum tube to produce a potential of same magnitude on two opposite diagonal points of said Wheatstonebridge for a value of said output voltage from said electronic circuits corresponding to the value thereof during defect-free periods, an acoustic indicator interconnected across said diagonal points, and means to pass an alternating current through said indicator in response to the occurrence of a difference in potential between said points.

8. In combination with an apparatus having electronic circuits wherein a defect is occurring periodically only, a generator connected to said electronic circuits to energize the same to produce an output voltage of a predetermined magnitude during defect-free periods, an indicator circuit having input terminals connected to a stage of said electronic circuits to apply the output voltage produced at said stage across said input terminals, a sound-giving instrument in said indicator circuit, means for passing a sound frequency through said sound-giving instrument, electronic means in said indicator circuit, means for adjusting a fraction of said output voltage to said input terminals of said indicator circuit, means for applying said adjusted fraction of said output voltage to said electronic means and means for preventing passage of sound frequency through said sound-giving instrument as long as said fraction of said output voltage from said circuits under test does not depart from the magnitude which corresponds to fault-free operation.

9. In combination with an apparatus having electronic circuits wherein a defect is occurring periodically only, means to operate said electronic circuits to produce an output voltage therefrom of a predetermined value during defect-free periods, an indicator circuit comprising an electronic tube having a control grid arranged in said indicator circuit to form a direct current resistance therein, means to rectify said output voltage, means to select a fraction of said rectified output voltage and to apply the same as a bias to said grid to adjust the direct current resistance of said tube, means operable to produce a potential of the same magnitude at two spaced points in said indicator circuit, when said bias applied to said grid is derived from an output voltage of said electronic circuits which is produced therein during defect-free periods, an acoustic indicator interconnected across said spaced points, and means to pass an alternating current through said indicator in response to the occurrence of a difference in potential between said points.

10. In combination with an apparatus having electronic circuits wherein a defect is occurring periodically only, an arrangement for controlling variations of an alternating voltage derived from said electronic circuits, comprising means for operating said electronic circuits to produce an alternating output voltage of a predetermined value during defect-free periods, said arrangement further comprising an acoustic indicator, control means to make said acoustic indicator inoperative for a magnitude of said output voltage corresponding to said predetermined value thereof, and means for passing an alternating current through said acoustic indicator in response to the occurrence of variations of said output voltage departing from said predetermined value.

11. In indicator circuit arrangements, an acoustic indicator, means for applying a first alternating voltage of one frequency to said indicator circuit, means for applying a second alternating voltage to said indicator, said second alternating voltage having a frequency differing from said first mentioned alternating voltage, means for selectively passing one of said two alternating voltages to said acoustic indicator in response to an increase and a decrease respectively of said first alternating voltage from a predetermined magnitude thereof.

12. In indicator circuit arrangements, indicator means, electrical valve means, means for controlling a current through said indicator means by said electrical valve means, means for applying a direct current voltage to bias said electrical valve means, means for applying an alternating voltage to said valve means, means for adjusting said direct current voltage applied to said electrical valve means to prevent said alternating current voltage to pass through said valve means to said indicator for magnitudes of said alternating current voltage under a predetermined value.

13. In indicator circuit arrangements, indicator means, electrical valve means, means for controlling a current through said indicator means by said valve means, means for applying a first alternating current voltage to said valve means, means for applying a second alternating current voltage to said indicator circuit, means for deriving a direct current voltage from said second alternating current voltage, means for applying said direct current voltage to said valve means to bias the same to prevent passage of said first alternating current voltage through said valve means to said indicator means for a predetermined magnitude of said alternating current voltage from which said direct voltage is derived over a certain value.

14. In indicator circuit arrangements, indicator means, an electrical valve to control a current to said indicator means, another electrical valve to also control said current to said indicator means, means for applying to one of said valves an alternating current voltage and a direct current voltage, and means for applying to the other of said valves another alternating current voltage together with a direct current voltage derived from said first mentioned alternating voltage, means for simultaneously varying in opposite directions said direct current voltage supplied to the same valve as said first mentioned alternating voltage and means for varying said other alternating current voltage.

15. In indicator circuit arrangements, indicator means, an electrical valve to control a current to said indicator means, another electrical valve to also control said current to said indicator means, means for applying to one of said valves an alternating current voltage and a direct current voltage and means for applying to the other of said voltages another alternating current voltage having a frequency differing from said first mentioned alternating current voltage, together with a direct current voltage derived from said first mentioned alternating current voltage.

16. In indicator circuit arrangements, indicator means, an electrical valve to control a current to said indicator means, another electrical valve to also control said current to said indicator means, means for applying to one of said valves an alternating current voltage and a direct current voltage and means for applying to the other of said valves another alternating current voltage having a frequency differing from said first mentioned alternating current voltage together with a direct current voltage derived from said first mentioned alternating current voltage, resonance circuits associated with the means of supplying each of said alternating voltages tuned substantially to the frequencies thereof.

17. In indicator circuit arrangements, an electron tube having an anode circuit, a loud speaking indicator associated with said anode circuit, means for controlling a current through said electron tube including an electrical valve, another electrical valve independent thereof, means for supplying to one of said electrical valves an alternating current voltage and a direct current voltage, and means for applying to the other of said valves another alternating voltage together with a direct voltage derived from said first mentioned alternating voltage.

18. In indicator circuit arrangements, an electron tube having an anode circuit, loud speaking indicator means associated with said anode circuit, means for controlling a current through said electron tube including a first electrical valve and a second electrical valve, means for supplying an alternating current voltage and a direct current voltage to one of said electrical valves, and means for applying another alternating current voltage together with a direct current voltage derived from said first mentioned alternating voltage to the other of said valves and a feed back arrangement associated with the means for applying said further alternating voltage to said valve.

19. In indicator circuit arrangements, indicator means, means for applying an alternating current voltage to said indicator circuit means for applying another alternating current voltage to said indicator circuit, said other alternating current voltage having a frequency differing from said first mentioned alternating current voltage, means for selectively passing one of said two alternating current voltages to said indicator means responsive to an increase and a decrease respectively of said first mentioned alternating voltage from a predetermined magnitude thereof, and switch means for reversing the polarity of said first mentioned alternating current voltage.

20. In indicator circuit arrangements, indicator means, means for applying an alternating current voltage to said indicator circuit, means for applying another alternating current voltage to said indicator circuit, said other alternating current voltage having a frequency differing from said first mentioned alternating current voltage, means for selectively passing one of said two alternating voltages to said indicator means in response to an increase and a decrease respectively of said first mentioned alternating current voltage from a predetermined magnitude thereof, a step up transformer for supplying said first mentioned alternating current voltage to said indicator circuit.

21. In indicator circuit arrangements, indicator means, means for applying an alternating current voltage to said indicator circuit, means for applying another alternating current voltage to said indicator circuit, said other alternating voltage having a frequency differing from said first mentioned alternating current voltage, means for selectively passing one of said two alternating voltages to said indicator means in response to an increase and a decrease respectively of said first mentioned alternating current voltage from a predetermined magnitude thereof, a step up transformer for supplying said first mentioned alternating voltage to said indicator circuit, and switch means associated with said step up transformer to vary the ratio thereof.

22. In indicator circuit arrangements, indicator means, means for applying a voltage to said indicator means to produce a current through said indicator, means for applying an alternating current voltage to said indicator circuit arrangement and means having a time constant for controlling the current through said indicator responsive to the change in said alternating current voltage.

23. In indicator circuit arrangements, acoustic indicator means, means for producing an alternating current voltage varying with an operating condition, means for applying said alternating current voltage to said acoustic indicator means, means operable for silencing said acoustic indicator for a predetermined magnitude of said alternating voltage and means for making said acoustic indicator operative for magnitudes of said alternating voltage differing from said predetermined magnitude.

24. A method for controlling departures of a predetermined value of an alternating current voltage in which a sound giving instrument is operated by a second alternating current voltage and by said alternating current voltage and in which both said alternating current voltages are balanced in such a manner as to prevent either of said alternating current voltages to produce sound from said sound giving instrument as long as said first mentioned alternating current voltage is of the magnitude within predetermined limits.

References Cited in the file of this patent

UNITED STATES PATENTS

| 1,781,363 | Bruce | Nov. 11, 1930 |
| 2,580,416 | Ericson | Jan. 1, 1952 |